(12) United States Patent
Lu et al.

(10) Patent No.: US 10,406,474 B2
(45) Date of Patent: Sep. 10, 2019

(54) METHOD FOR REMOVING VAPORS GENERATED BY PROCESSING DEVICE

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Li-Chin Lu, New Taipei (TW); Jian-Hua Xiang, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

(*) Notice: Subject to any disclaimer, the term of this patent is extended or adjusted under 35 U.S.C. 154(b) by 157 days.

(21) Appl. No.: 15/687,615

(22) Filed: Aug. 28, 2017

(65) Prior Publication Data

US 2018/0353894 A1    Dec. 13, 2018

(30) Foreign Application Priority Data

Jun. 8, 2017    (CN) .......................... 2017 1 0429530

(51) Int. Cl.
*B01D 53/04* (2006.01)
*B30B 15/00* (2006.01)

(52) U.S. Cl.
CPC .......... *B01D 53/04* (2013.01); *B30B 15/0082* (2013.01); *B01D 2259/45* (2013.01)

(58) Field of Classification Search
CPC .... B01D 53/04; B01D 53/06; B01D 2259/45; B30B 15/0082

USPC .................. 96/150, 154; 95/90, 107; 55/422
See application file for complete search history.

(56) References Cited

U.S. PATENT DOCUMENTS

| | | | | |
|---|---|---|---|---|
| 5,169,414 A | * | 12/1992 | Panzica .............. | B01D 53/0431 95/113 |
| 7,959,712 B2 | * | 6/2011 | Kim .................... | B01D 53/0462 95/107 |
| 8,449,661 B2 | * | 5/2013 | Broborg .............. | A61M 16/105 128/205.12 |
| 2018/0071676 A1 | * | 3/2018 | Sakikawa ................ | B01J 20/26 |

FOREIGN PATENT DOCUMENTS

| CN | 204294631 U | 4/2015 |
|---|---|---|
| TW | M396201 | 1/2011 |

* cited by examiner

*Primary Examiner* — Frank M Lawrence, Jr.
(74) *Attorney, Agent, or Firm* — ScienBiziP, P.C.

(57) ABSTRACT

A method for removing vapors generated by a processing device presenting reduced risk to human handlers includes placing a vapor removing device in a feed area of the processing device. The vapor removing device includes a connecting plate and at least one vapor removing element each connected to one surface of the connecting plate. The vapor removing device is lifted robotically from the feed area and placed into the processing device. Then, the vapor removing element directly removes vapors generated by the processing device when the processing device starts to work, the device being robotically taken out of the processing device and placed back in the feed area.

11 Claims, 4 Drawing Sheets

METHOD FOR REMOVING VAPORS GENERATED BY PROCESSING DEVICE

FIELD

The subject matter herein generally relates to environmental and industrial safety and a method for removing vapors generated by a processing device.

BACKGROUND

Processing devices (for example, cold pressing devices) may generate vapors when the processing devices temporarily stop working or are placed in wet working environment. The vapors must be manually cleared from the area. However, this may lower the working efficiency. Furthermore, operators may not be permitted to enter the working place for safety and/or security reasons.

BRIEF DESCRIPTION OF THE DRAWINGS

Implementations of the present technology will now be described, by way of example only, with reference to the attached figures.

DETAILED DESCRIPTION

Figure 1:
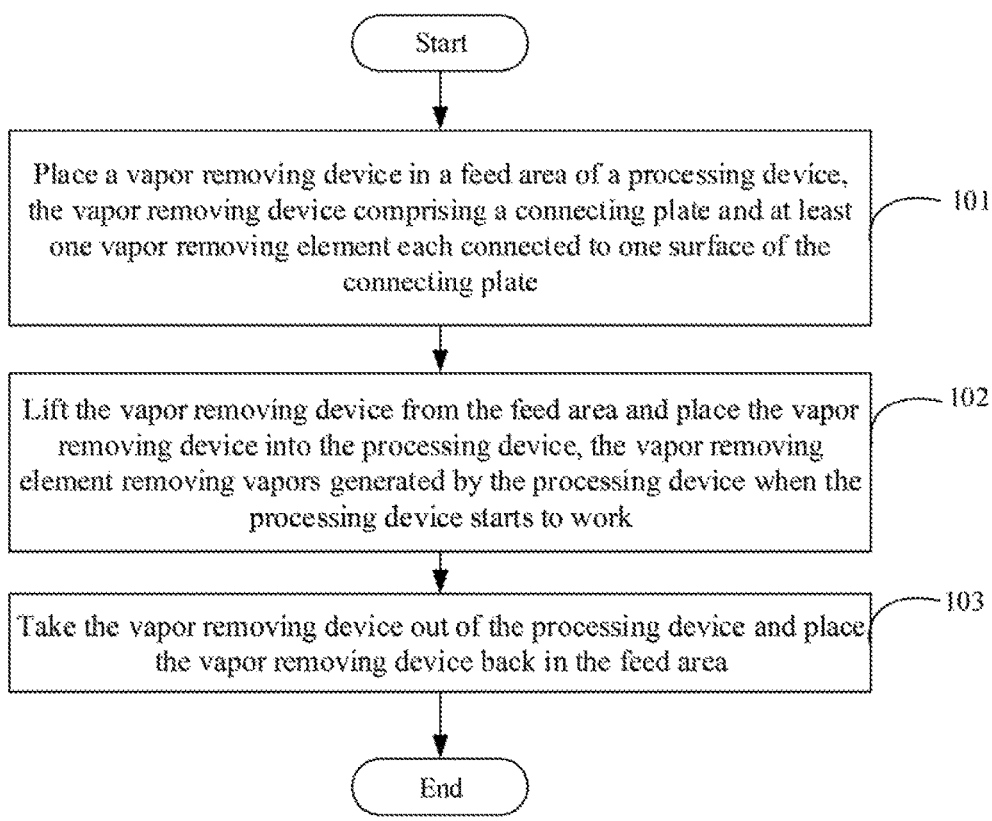
FIG. 1 is a block diagram of an exemplary embodiment of a method for removing vapors generated by a processing device, according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series and the like.

Referring to FIG. 1, a flowchart of a method for removing vapors generated by a processing device is presented in accordance with an example embodiment. The exemplary method is provided by way of example, as there are a variety of ways to carry out the method. Each block shown in FIG. 1 represents one or more processes, methods or subroutines, carried out in the exemplary method. Additionally, the illustrated order of blocks is by example only and the order of the blocks can change. The exemplary method can begin at block 11.

Figure 2:
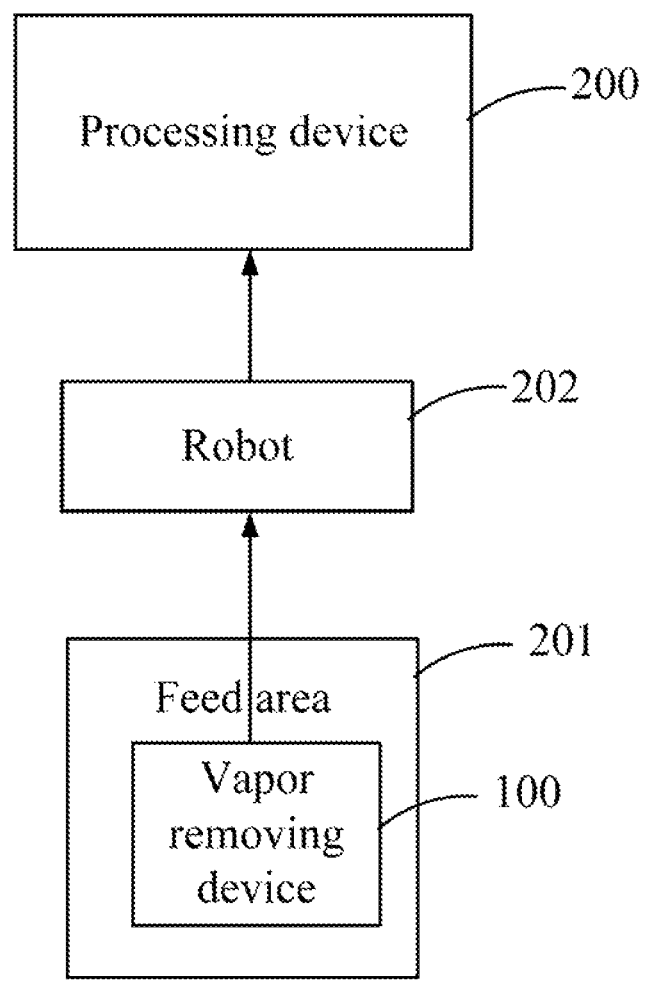
FIG. 2 is a diagram showing a vapor removing device and the processing device used in the method of FIG. 1.

At block 101, referring to FIG. 2, a vapor removing device 100 is placed in a feed area 201 of the processing device 200. The feed area 201 can be arranged adjacent to the processing device 200. The processing device 200 has a robot 202 for feeding workpieces (not shown) from the feed area 201 to an inlet opening of the processing device 200, which applies further processing to the workpieces.

Figure 3:
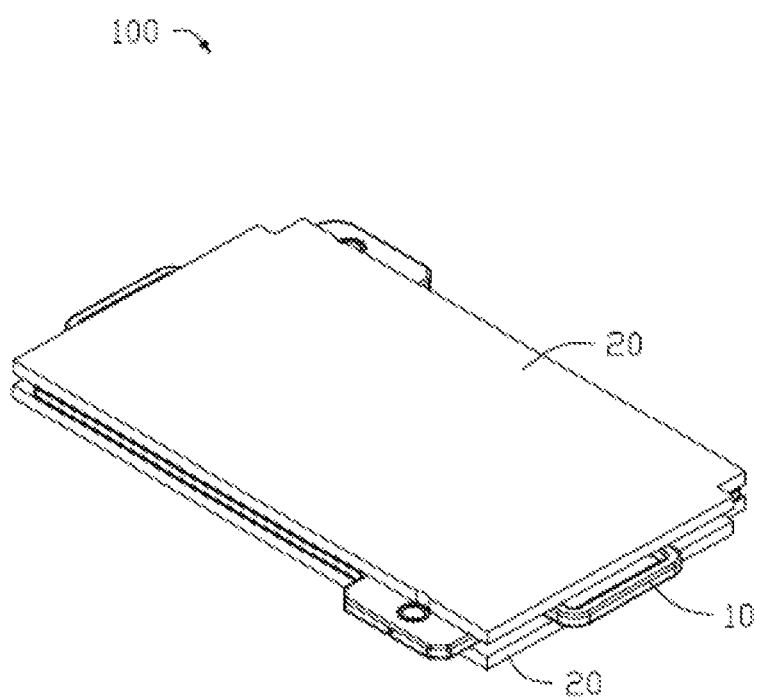
FIG. 3 is a diagram of the vapor removing device of FIG. 2.
Figure 4:
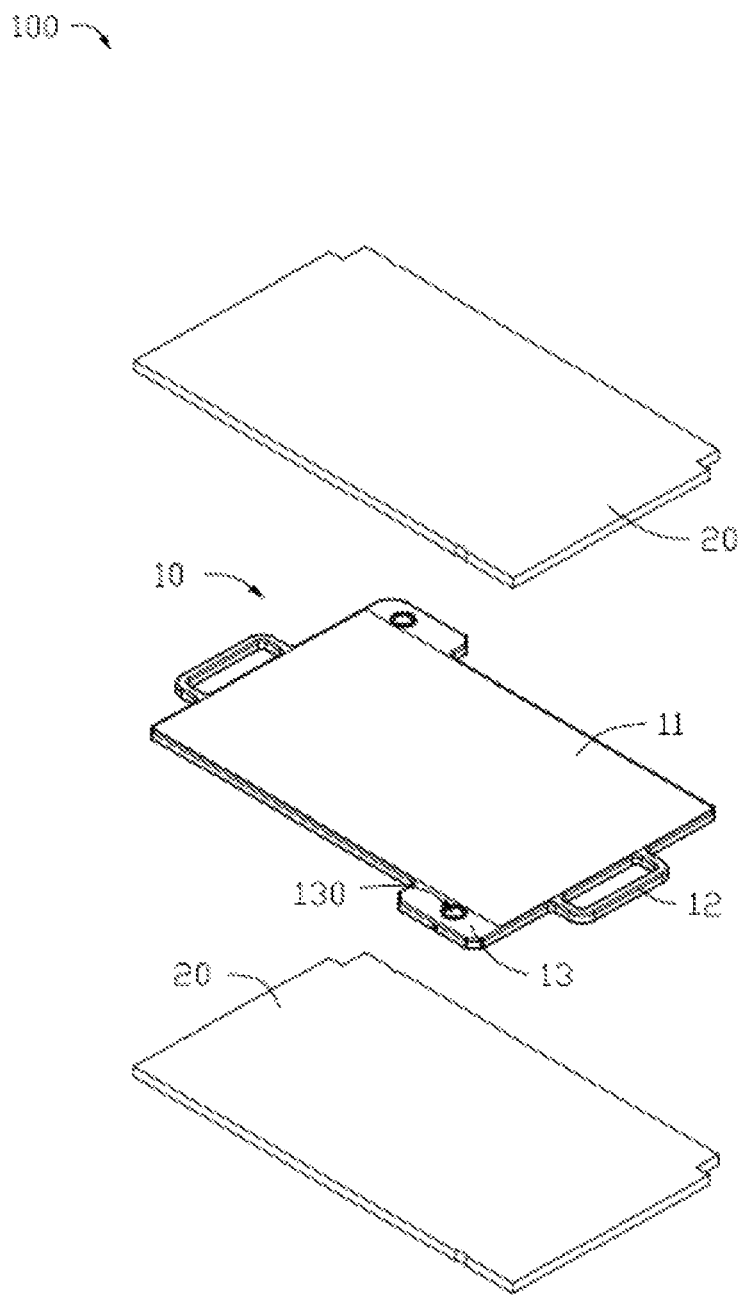
FIG. 4 is an exploded diagram of the vapor removing device of FIG. 3.

Referring to FIGS. 3 and 4, the vapor removing device 100 comprises a connecting plate 10 and at least one vapor removing element 20. Each vapor removing element 20 is connected to one surface of the connecting plate 10. In at least one exemplary embodiment, the connecting plate 10 is an aluminum plate. The vapor removing element 20 is a sponge which can absorb vapors. The vapor removing element 20 can be glued to the connecting plate 10. In at least one exemplary embodiment, the vapor removing device 100 comprises two vapor removing elements 20 connected to opposite surfaces of the connecting plate 10.

In at least one exemplary embodiment, the vapor removing device 100 has a length and a width equal to those of the workpiece. Thus, the processing device 200 and the workpieces can share the same feed area 201. The vapor removing device 100 thus does not require its own or another feed area 201.

In at least one exemplary embodiment, the connecting plate 10 comprises a connecting portion 11 and at least one operating portion 12 connected to the connecting portion 11. Each operating portion 12 protrudes from an edge of the connecting portion 11, and is coplanar with the connecting portion 11. An operator can pull the vapor removing device 100 through the operating portion 12 and place it in the feed area 201. The connecting portion 11 and the vapor removing element 20 can both be rectangular and have a same size. The operating portion 12 can be ring-shaped for convenient gripping by the operator.

The connecting plate 10 can further comprise at least one positioning portion 13 connected to the connecting portion 11. Each positioning portion 13 protrudes from an edge of the connecting portion 11 which forms no operating ring 12, and is coplanar with the connecting portion 11. The positioning portion 13 can define a positioning hole 130. When the vapor removing device 100 is placed in the feed area 201, the positioning hole 130 is engaged with a positioning post (not shown) of the feed area 201, thereby positioning the vapor removing device 100 as required in the feed area 201.

At block 102, the robot 202 lifts the vapor removing device 100 from the feed area and places the vapor removing 100 into the processing device 200. Then, the processing device 200 starts to work, and the vapor removing element 20 of the vapor removing device 100 removes vapors generated by the processing device 200.

In at least one exemplary embodiment, the processing device 200 is a cold pressing device. After the vapor removing device 100 is placed into the cold pressing device, the cold pressing device starts to work and presses the vapor removing element 20. The cold pressing device has an upper mold and a lower mold. A mold opening height is constant (equal to the thickness of the workpiece) between the upper mold and the lower mold. The vapor removing element 20 after being pressed has a thickness less than or equal to the mold opening height. Thus, it is no need to adjust the mold opening height before the vapor removing device 100 is placed into the cold pressing device. In at least one exemplary embodiment, an original thickness of the vapor removing device 100 and a thickness of the vapor removing device 100 after being pressed is in a ratio of less than 50%.

At block 104, the robot 202 takes the vapor removing device 100 out of the processing device 200 and places the vapor removing device 100 back in the feed area 201.

Therefore, the operator only needs to place the vapor removing device 100 in the feed area and is not required to have further contact with it. This is safe and time-saving.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A method for removing vapors generated by a processing device comprising:
    placing a vapor removing device in a feed area of the processing device, the vapor removing device comprising a connecting plate and at least one vapor removing element, each vapor removing element connected to one surface of the connecting plate;
    lifting the vapor removing device from the feed area and placing the vapor removing device into the processing device, so that the vapor removing element removes vapors generated by the processing device when the processing device starts to work; and
    taking the vapor removing device out of the processing device and placing the vapor removing device back in the feed area.

2. The method of claim 1, wherein the connecting plate is an aluminum plate, and the vapor removing element is a sponge.

3. The method of claim 1, wherein the vapor removing element is connected to the connecting plate by adhesive.

4. The method of claim 1, wherein the vapor removing device has a length and a width equal to workpiece processed by the processing device.

5. The method of claim 1, wherein the connecting plate comprises a connecting portion and at least one operating portion connected to the connecting portion, each operating portion protrudes from an edge of the connecting portion, and is coplanar with the connecting portion.

6. The method of claim 5, wherein the connecting portion and the vapor removing element are both rectangular and have a same size.

7. The method of claim 5, wherein the connecting plate further comprises at least one positioning portion connected to the connecting portion, each positioning portion protrudes from an edge of the connecting portion which forms no operating ring, and is coplanar with the connecting portion.

8. The method of claim 1, wherein the processing device is a cold pressing device and presses the vapor removing element when the processing device starts to work, the vapor removing element after being pressed has a thickness less than or equal to a mold opening height of the processing device.

9. The method of claim 8, wherein an original thickness of the vapor removing device and a thickness of the vapor removing device after being pressed is in a ratio of less than 50%.

10. The method of claim 1, wherein the vapor removing device is lifted or taken by a robot.

11. A method for removing vapors generated by a processing device comprising:
    placing a vapor removing device in a feed area of the processing device, the vapor removing device comprising a connecting plate and two vapor removing elements connected to opposite surfaces of the connecting plate;
    lifting the vapor removing device from the feed area and placing the vapor removing device into the processing device, so that the vapor removing elements remove vapors generated by the processing device when the processing device starts to work; and
    taking the vapor removing device out of the processing device and placing the vapor removing device back in the feed area.

* * * * *